United States Patent

[11] 3,618,730

[72] Inventor Herbert Mould, III
Bloomfield, N.J.
[21] Appl. No. 884,489
[22] Filed Dec. 12, 1969
[45] Patented Nov. 9, 1971
[73] Assignee Vari-Typer Corporation
Hanover, N.J.

[54] TORQUE-LIMITING CLUTCH
8 Claims, 3 Drawing Figs.
[52] U.S. Cl.................................................. 192/56 C, 192/74
[51] Int. Cl..................................................F16d 13/08, F16d 43/21
[50] Field of Search.......................................... 192/41 S, 56 C, 74

[56] References Cited
UNITED STATES PATENTS
1,561,537 11/1925 Hayes............................ 192/56 C X
1,629,098 5/1927 Drexler......................... 192/56 C X
1,629,420 5/1927 Starkey......................... 192/56 C X Primary Examiner—Allan D. Herrmann
Attorneys—Russell L. Root and Ray S. Pyle ABSTRACT: A torque-limiting device is provided which has a rotatably mounted driving member and a driven member. The driving member is connected to a spring cage member through a torsion spring. A clutch spring is disposed to provide frictional driving engagement between the cage member and the driven member. The clutch spring and the driving member are provided with coacting surfaces to release the driving engagement between the cage member and the driven member when a given angular displacement between the cage member and the driving member occurs. The angular displacement between the driving member and the cage member will be proportional to the torque applied by virtue of the torsion spring connection between the driving member and the cage member.

HERBERT MOULD III
INVENTOR

BY Ray S Pyle
ATTORNEY

TORQUE-LIMITING CLUTCH

BACKGROUND OF THE INVENTION

This invention relates to devices in which a positive driving connection between a driving member and a driven member is desired up to a predetermined driving torque load, and which will allow slippage between the driving member and driven member at a higher torque load than this predetermined value.

The invention is generally applicable to any situation wherein it is desired to drive a member to develop torque up to a predetermined maximum and prevent transmission of torque, (i.e., allow slippage) above the predetermined torque level.

There have been many prior art devices accomplishing this purpose. The present invention constitutes an improvement over the prior art devices in that a relatively simple, inexpensive yet reliable torque-limiting device is provided which will function precisely at a given, and preferably an adjustable, torque level.

SUMMARY OF THE INVENTION

An advantage of this invention is that drive is accomplished through a wound torsion spring, and a predetermined degree of angular displacement between the driver and driven members is employed to trigger a complete release of s spring clutch.

Briefly, the present invention is comprised of a driving member and a driven member. A cage member is provided and transmission means in the form of a torsion spring drivingly interconnects the driving member with the cage member. The transmission means provides a given change in relationship between the cage member and the driving member at a given torque level. Releasable engagement means in the form of a clutch spring drivingly interconnects the driven member and the cage member. The clutch spring and cage member include cooperating means disposed to release the driving interconnection of the clutch spring between the driven member and the cage member when the given change in relationship between the position of the cage member and the driving member occurs.

Figure 1:
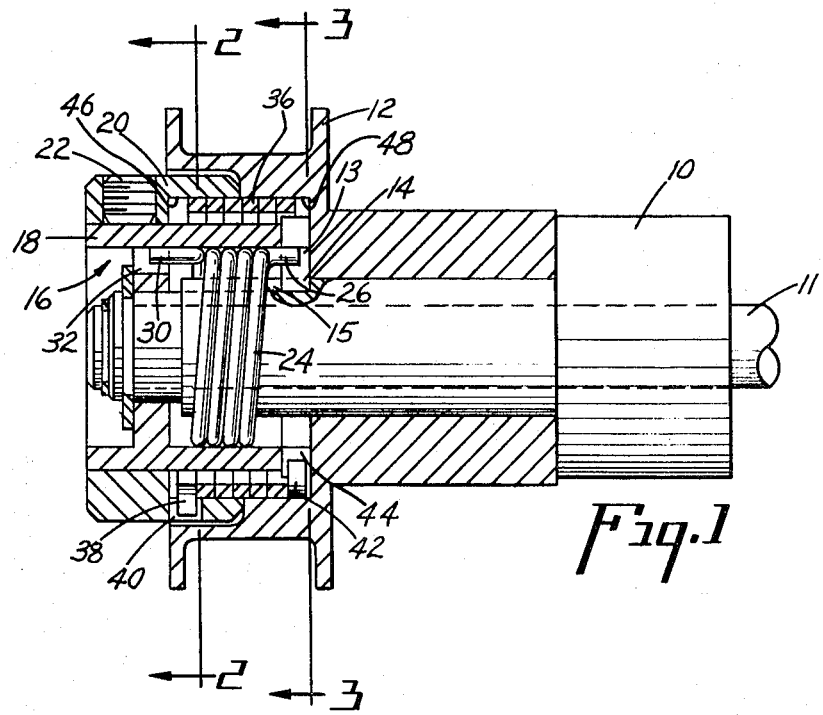
FIG. 1 is a longitudinal sectional view of a torque-limiting device according to this invention.

An annular driving disc 13 is keyed to the drive collar 10 by a key 14 and key slot 15. The drive collar 10 and driving disc 13 together define a driving member.

A spring cage 16 is provided which surrounds the drive collar 10. The spring cage is comprised of an inner sleeve section 18 and an outer ring section 20 interconnected by set screws, one of which is shown at 22. The spring cage 16 is formed in two parts to allow for adjustment of the torque load at which the device will slip, as will be explained presently. However, if no such adjustment is required, the spring cage could be made of a single component rather than of separate sleeve and ring portions.

Figure 2:
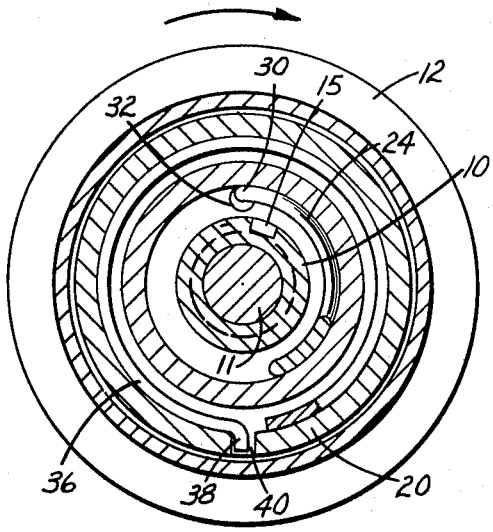
FIG. 2 is a sectional view taken substantially along the plane designated by the line 2—2 of FIG. 1.

A torsion spring 24 is wound around the drive collar 10 and has one end thereof 26 disposed in an aperture 28 formed in the driving disc 13 (FIGS. 1 and 3), and the other end 30 thereof disposed in an aperture 32 formed in the sleeve section 18 of the spring cage 16 (FIGS. 1 and 2). The torsion spring 24 provides transmission means in the form of a resilient drive connection between the drive collar 10 and the spring cage 16, and upon rotation of the drive collar will cause the spring cage 16 to rotate therewith.

Figure 3:
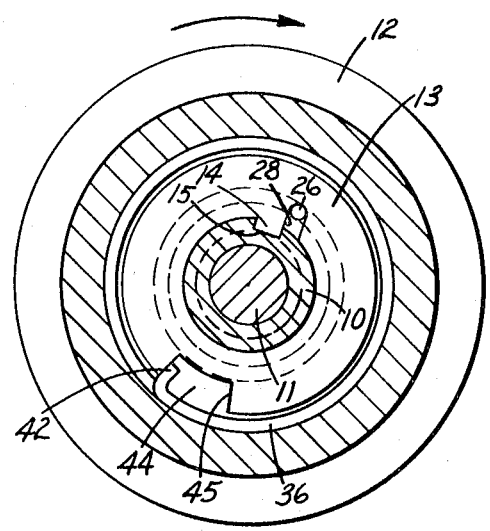
FIG. 3 is a sectional view taken substantially along the plane designated by the line 3—3 of FIG. 1. DESCRIPTION OF THE PREFERRED EMBODIMENT Referring now to the drawing, a torque-limiting device is shown which is adapted to drivingly interconnect a drive collar 10 journaled on shaft 11 to a driven pulley 12 so that the drive collar will drive the pulley up to a predetermined torque level, above which level slippage will occur. The drive collar 10 is connected to any suitable power source, such as an electric motor, (not shown) for providing rotation thereto. The direction of rotation of the device is shown by the arrows in FIGS. 2 and 3.

A clutch spring 36 surrounds the sleeve 18. The clutch spring 36 has one end 38 disposed in an aperture 40 formed in the ring section 20 of the spring cage 16 (FIGS. 1 and 2) and the opposite end 42 disposed in an elongated slot 44 formed in the driving disc 13 (FIGS. 1 and 3). As can best be seen in FIG. 3, the slot 44 has one end surface 45 which constitutes an actuating surface, and the end 42 of the clutch spring 36 is normally spaced from this actuating surface 45.

The clutch spring 36 is formed of a flat wire and is configured so that it is normally held by its inherent expansion into tight contact with both the inner surface 46 of the ring section 20, and the inner surface 48 of the driven pulley 12, so that in this there will be a driving connection between the spring cage 16 and the driven pulley 12 when driven in the direction of rotation shown by the arrows in FIGS. 2 and 3.

OPERATION

When the drive collar 10 is rotated, a driving torque will be applied to the spring cage 16 through the torsion spring 24 which will cause rotation of the spring cage 16. Since the clutch spring 36 provides a drive interconnection between the spring cage 16 and the driven pulley 12, the pulley will rotate with the spring cage 16.

With respect to the driving of the spring cage 16 by the drive collar 10, the torsion spring provides a resilient driving connection therebetween, and any torque developed will cause an angular displacement between the collar and cage proportional to the torque; i.e., the cage will lag behind the drive collar an amount proportional to the torque. This proportional angular displacement is utilized to interrupt the driving interconnection between the driven pulley 12 and drive collar 10 at a given torque level in the following manner:

The driving disc 13 is keyed to the drive collar 10, so that the actuating disc will be displaced angularly with respect to the spring cage 16 the same as the drive collar. This angular displacement is a clockwise direction of the driving disc 13 with respect to the spring cage 16 as viewed in FIG. 3. Since the clutch spring 36 is in engagement with the cage, it will function therewith. Therefore, an angular displacement will also exist between the clutch spring 36 and the driving disc 13 proportional to the torque. This displacement will move the actuating surface 45 of the slot 44 closer to the end 42 of the clutch spring 36. The greater the torque, the greater the angular displacement and hence the closer actuating surface 45 will come to the end 42 of the clutch spring 36 until a torque is reached which will cause the actuating surface 45 to engage the end 42 of the spring. Further movement will "wind down" or partially collapse spring 36. When the spring is wound down, it decreases in diameter, and when the diameter is decreased, the drive interconnection afforded by the spring between cage and pulley will cease. This loss of driving interconnection occurs at a given angular displacement of the cage with respect to the actuating disc, which angular displacement represents a given torque. Hence, any torque below this level will be transmitted, but torque about this level will not be.

As explained above, the two piece construction of the spring cage 16 allows the torque value at which the device will slip to be adjusted. The adjustment relies on the fact that the amount of torque required to produce a given angular relationship is a function of the torsion preload of the torsion spring 24. The greater the preload of the spring, the greater the torque required to produce a given angular displacement. The torque preload in the spring 24 can be changed by rotating the sleeve portion 18 of the spring cage 16 with respect to both the ring portion 22 thereof and the drive collar 10.

In order to effect such a change, the set screws 22 are loosened. The drive collar 10 and ring portion 20 are held in a fixed relative position, and the sleeve portion 18 is rotated in a direction which will tend to preload the torsion spring 24. This preload of the spring 24 will correspondingly increase the torque required to effect a given angular displacement between the spring cage 16 and drive collar 10. Since the position of the ring portion 22 and drive collar 10 is unchanged, the end 42 of the spring 36 will remain in its same relative position in the slot 44 when the sleeve is rotated. Hence, the same total angular displacement between the spring cage 16 and drive collar 10 will be required to cause the actuating surface 45 to engage end 42 of the spring. However, a greater torque is required to attain this angular displacement.

What is claimed is:

1. A torque device comprising:
   a driving member;
   a cage member;
   transmission means drivingly interconnecting said driving member and said cage member disposed to provide a given change in relationship between at least a portion of said cage member and said driving member at a given torque;
   a driven member;
   releasable clutch spring means drivingly interconnecting said driven member and said cage member, said releasable engagement means and said portion of said cage member including coactable portions of said driving member and said clutch spring disposed to release the driving interconnection of said engagement means between said driven member and said cage member when said given change in relationship between said portion of cage member and said driving member occurs.

2. The invention as defined in claim 1 wherein said engagement means interconnecting said driven member and said cage member includes clutch spring means.

3. The invention as defined in claim 1 wherein said transmission means includes means to cause a given angular displacement of said cage member and said driving means at a given torque level.

4. The invention as defined in claim 1 wherein said transmission means includes means to cause relative displacement of said cage member and said driving member proportional to the torque.

5. The invention as defined in claim 1 wherein said transmission means includes torsion spring means drivingly interconnecting said cage member and said driving member.

6. The invention as defined in claim 1 further characterized by means disposed to adjust the torque level at which the driving connection between the cage member and driven member is released.

7. The invention as defined in claim 1 wherein said transmission means includes a torsion spring, and means disposed to adjust the preload of said torsion spring, whereby to adjust the torque at which the driving connection is released.

8. The invention as defined in claim 1 further characterized by said engagement means interconnecting said cage member and said driven member including clutch spring means, and said cooperating means includes coactable portions of said driving member and said clutch spring, and wherein said transmission means includes torsion spring means, and said driven member and said torsion spring and said cage member are mounted to provide a relative angular displacement of said cage member and said driving member proportional to the torque, and wherein said coacting portions of said clutch spring and said driving member coact at a given angular relationship to release said driving connection of said clutch spring and said driven member.

* * * * *

UNITED STATES PATENT OFFICE
CERTIFICATE OF CORRECTION

Patent No. 3,618,730      Dated November 9, 1971

Inventor(s) Herbert Mould III

It is certified that error appears in the above-identified patent and that said Letters Patent are hereby corrected as shown below:

Column 3, lines 27 and 30, "engagement", in each of the lines, should read -- clutch spring --;

Column 3, cancel lines 34 and 35;

Column 4, cancel line 1;

Column 4, cancel lines 21, 22, 23, 24, and 25 and substitute -- The invention as defined in claim 1 further characterized in that said trans- --.

Signed and sealed this 13th day of June 1972.

(SEAL)
Attest:

EDWARD M. FLETCHER, JR.
Attesting Officer

ROBERT GOTTSCHALK
Commissioner of Patents